2,730,429
Patented Jan. 10, 1956

2,730,429

METHOD OF MAKING SUBSTANTIALLY PURE CUPRIC DIAMMINO CARBONATE

Helmer A. Abramson, Hancock, Mich., assignor to Calumet & Hecla, Inc., a corporation of Michigan No Drawing. Application March 10, 1954,
Serial No. 415,411

8 Claims. (Cl. 23—61)

This invention relates to a method of making substantially pure cupric diammino carbonate.

In the past cupric diammino carbonate has been precipitated from a solution of ammonia and ammonium carbonate containing dissolved copper carbonate by the addition of ethyl alcohol. However, this process has the disadvantages of being expensive, hazardous, slow and of requiring special equipment that is often expensive to build and to operate.

One of the features of this invention is the provision of a method of making substantially pure crystalline cupric diammino carbonate comprising leaching either a clean or a contaminated material containing metallic copper with an aqueous solution of ammonium carbonate containing cupric ions until a substantially saturated solution of cupric-cuprous diammino carbonate is obtained, contacting this solution with an oxidizing agent, preferably in gaseous form, to convert the solution to a supersaturated solution of cupric diammino carbonate, crystallizing the cupric diammino carbonate from the solution and separating the crystals from the liquid.

Another feature of the invention is the provision of a method of making substantially pure crystalline cupric diammino carbonate comprising leaching this metallic copper-containing material with an aqueous solution of ammonium carbonate containing cupric ions until a substantially saturated solution of cupric-cuprous diammino carbonate is obtained, the aqueous solution having an ammonium carbonate concentration of about 280 to 425 grams per liter, contacting the solution with an oxidizing agent to convert the solution to a supersaturated solution of cupric diammino carbonate, crystallizing the cupric diammino carbonate from the solution and separating the crystals from the liquid.

Other features and advantages of the invention will be apparent from the following description of various embodiments thereof.

The methods described and claimed herein have a number of advantages over the methods practiced heretofore. Thus, the new methods are economical, efficient and simple to operate and there is very little waste as the liquid from which the crystalline material is separated may easily be recharged and used again in the process. Furthermore, the process permits recovering the cupric diammino carbonate in crystalline form of very high purity so that the product may be used without further treatment to produce pure products such as metallic copper. Another advantage of the invention is that the physical form of the cupric carbonate, and especially its particle size and particle shape, makes the carbonate extremely valuable in further processing, especially in copper powder manufacture.

A very important advantage of the new process is that no special equipment is required. Furthermore, the process may be operated at atmospheric pressures and ordinary temperatures if such is desired. The process, which includes leaching copper from a metallic copper-containing material, permits a high concentration of total copper to be dissolved in the leaching solution. This permits a correspondingly high concentration of the cupric complex in the solution and results in a high extraction rate of the copper from the material being leached, as this extraction rate appears to be directly proportional to the concentration of cupric ions in the solution.

In the method of this invention a metallic copper-containing material is leached with an aqueous solution of ammonium carbonate containing cupric ions until a substantially saturated solution of cupric-cuprous diammino carbonate is obtained. This solution is then contacted with an oxidizing agent, preferably in a separate container, as by bubbling air or other similar oxidizing material through the solution in order that the cuprous compound will be converted to cupric diammino carbonate. As the cupric diammino carbonate is much less soluble than is the cuprous compound, the solution thereupon becomes supersaturated with the cupric compound. This cupric diammino carbonate is then crystallized from the solution and the crystals are separated from the resulting liquid or mother liquor. These crystals have a high degree of purity and may be used in subsequent manufacturing operations without requiring further purification.

In the preferred process, the aqueous leaching solution has an initial ammonium carbonate concentration of about 280 to 425, and preferably 300 to 370, grams per liter. This ammonium carbonate also preferably has a ratio of ammonia to carbon dioxide of at least 2 to 1 on a mol basis. The initial concentration of total copper in the leaching solution is preferably about 70 to 160 grams per liter.

After the crystalline cupric diammino carbonate has been separated from the liquid in the above process, this liquid may be regenerated by adding ammonia and carbon dioxide thereto. The liquid may then be used in leaching a further amount of metallic copper-containing material. In the process the crystals of cupric diammino carbonate, after being separated from the liquid, are dried preferably at a temperature of about 50 to 70° C.

The substantially pure crystalline cupric diammino carbonate which is produced by the methods of this invention may be obtained in practically any desired particle size range by controlling the manner in which the crystals are formed. Thus, during the oxidation step where the dissolved cuprous diammino complex is oxidized to the cupric state, such as by passing an oxygen-containing gas, preferably air, through the solution until supersaturation is maintained, the crystalline solid begins to form. This formation of the solid produces nuclei which continue to grow and thus gradually strip the solution of a large proportion of its copper content. These crystals may be recovered from the solution by any conventional filtering, centrifuging or combined filtering and centrifuging steps.

Techniques which are entirely novel in crystallizing processes are used to induce crystallization and to control the particle size range and, to a certain extent, the particle shape of the crystalline cupric diammino carbonate. In conventional practice crystallization may be brought about and controlled by cooling the solution without substantial evaporation. It may also be brought about by evaporation without substantial cooling, adiabatic evaporation and cooling in vacuum and salting out the crystals by adding an organic precipitant such as ethyl alcohol. In crystallizing cupric diammino carbonate these methods are replaced by a novel procedure in which oxidation is used to produce the required supersaturation. This is accomplished by the use of air or an oxygen-containing gas to oxidize the cuprous ammino complex present in the leaching solution to the cupric form. At the point of supersaturation the solid crystalline cupric diammino compound precipitates. If desired, the solution may be seeded with fine particles of the cupric carbonate so that crystals will begin to form on these seeds.

During the oxidation or crystallization, the solution may be agitated with any degree of violence desired in order to control crystal size. Thus, with increased agitation a large proportion of smaller crystals are formed as the agitation prevents the crystals from growing together. Where only a small amount of agitation is produced, the crystals will be correspondingly larger. Thus, by the process of this invention the rate of growth, size, and, to a certain extent, shape, of the crystals are easily controlled by means well known to those skilled in the art, so that the method produces a ready means for making crystals in any required or desired size range. This is quite important in such instances as where the resulting compound is to be used in producing copper powder, as the size of the cupric diammino crystals is the determining factor in the particle size of the resulting copper powder.

In the process of this invention, a solution containing comparatively high concentrations of total copper in the form of dissolved cuprous and cupric ammino carbonates is first obtained by leaching metallic copper-containing materials with cupric ammonium carbonate solutions. For efficient recovery and high leaching rates in both batch and continuous type operations, ammonium carbonate should be present in the range of about 280 to 425 grams per liter, with a preferred range of about 300 to 370 grams per liter. The ratio of ammonia to carbon dioxide should be approximately 2 to 1 on a mol basis or 34 to 44 by weight. Additional ammonia may be present without imposing any serious disadvantage in the leaching step. However, an excess is not desirable in the oxidation stage as the solubility of the diammino compound is greater and more air or other oxidizing agent is required (with the loss of some ammonia) in order to start crystallization. The solution strength specified allows a high concentration of total copper to be dissolved in the leaching solution and permits correspondingly high concentration of the cupric copper complex. This condition is favorable for high extraction rates—the extraction rates appear to be proportional to the concentration of cupric copper in the solution.

In continuous operations the total copper and cupric copper concentrations are higher than in batch operations as the pick-up of copper per cycle must be sufficient to allow the supersaturation point to be reached in the cycle. In batch operations the concentrations must be low enough to allow a sufficient amount of copper to be dissolved before supersaturation, otherwise, there is a marked loss in efficiency. Therefore, in continuous processing, the initial total copper strengths are preferred in the range of about 120 to 160 grams per liter; whereas in batch operations the limits of about 70 to 120 grams per liter are more desirable.

In the leaching operation metallic copper-containing materials are placed in tanks through which the starting leaching solution is circulated until the copper content is increased to a point of saturation without precipitation of the diammino salt from the solution. In batch operations oxidation of the cuprous complex ion to the cupric ion is preferably simultaneously carried out by circulating the solution through an oxidation tower. This procedure makes it possible to maintain a high concentration of cupric ions having high leaching rates. A concentration of cupric ions is maintained in the range of about 50 to 110 grams per liter in batch operations. Higher limits are applicable in continuous operations, preferably in the range of about 70 to 110 grams per liter.

Leaching is permitted to continue until the total copper (cuprous plus cupric) concentration is in the range of about 120 to 170 grams per liter. After the copper has been concentrated in this range the solution is withdrawn from the leaching cycle into suitable equipment for oxidation, preferably with air or an oxygen-containing gas. This oxidation produces a pure cupric diammino carbonate—a dark blue crystalline compound. The oxidation of the cuprous complex to the cupric form increases the concentration of the latter until its normal solubility in solution is exceeded; viz., supersaturation. The formation of crystal nuclei provides a surface for further crystal growth or the solution may be "seeded" with the diammino compound to accelerate crystallization. As the crystals develop in the bath they may be withdrawn batch-wise or continuously and subsequently centrifuged or filtered to remove excess moisture. The crystals may be subsequently dried, preferably in the range of about 50 to 70° C., and stored for further usage.

The mother liquor from the crystallizer is preferably treated with ammonia and carbon dioxide and regenerated for use in the leaching operation. Conventional sources may be used but ammonia and carbon dioxide may also be derived from the flash roasting of the copper diammino carbonate to copper powder. Continuous processing is made possible by this new technique and tests indicate that the amount of copper recovered is equal to the copper leached from starting materials.

*Example 1.—Batch method*

Copper wire contained in a vertical cylindrical tube and in sufficient amount for several-fold saturation of the leaching solution was leached with 2300 milliliters of ammonium carbonate solution containing 90.0 grams per liter cupric copper and 370 grams per liter ammonium carbonate by circulation at the rate of 480 milliliters per minute for 10.3 hours. Air was intermittently bubbled through the solution to oxidize the cuprous copper generated in the solution to the cupric form. The total copper concentration reached 162.7 grams per liter, cupric copper 74.1 grams per liter and cuprous copper 88.6 grams per liter after 8 hours. The solution was less vigorously aerated while leaching for an additional 2.3 hours during which crystals of cupric diammino carbonate precipitated. The solution analyzed 148.6 grams per liter total copper, 72.7 grams per liter cupric copper and 75.9 grams per liter cuprous copper at the end of this period. The slurry was then transferred to uncovered vessels and aerated by blowing air through for 4 hours. 2070 milliliters of mother liquor containing 100.0 grams per liter copper, 94.2 grams per liter cupric copper and 5.8 grams per liter cuprous copper was recovered. Cupric diammino carbonate, $CuCO_3 \cdot 2NH_3$ recovered—424 grams. The product was dried in air, crushed manually in a mortar and sieved to pass a 50-mesh sieve.

PRODUCT.—$CuCO_3 \cdot 2NH_3$

|  | Analysis | Theoretical | Particle Size |  |
|---|---|---|---|---|
|  | *Percent* | *Percent* |  | *Percent* |
| Cu | 40.45 | 40.31 | −50+100 Mesh | 26 |
| $NH_3$ | 21.37 | 21.61 | −100+200 Mesh | 37 |
| $CO_2$ | 28.63 | 27.92 | −200+325 Mesh | 23 |
|  |  |  | −325 Mesh | 14 |
|  |  |  |  | 100 |

*Example 2.—Semi-continuous operation*

Copper was continuously leached by circulating a solution containing 101.0 grams per liter cupric copper, 0 grams per liter cuprous copper, 316 grams per liter ammonium carbonate at 250 milliliters per minute through a system containing in order, leaching, oxidizing, crystallizing and solution make-up (containing solid ammonium carbonate) units. The solution was continuously recycled through the system for 5 hours, first to build up the cupric copper and ammonium carbonate concentrations, after which for an additional 2 hours, to precipitate cupric diammino carbonate. After 7 hours the oxidizing and crystallizing units were drained and the crystals filtered, dried in air, lightly crushed in a mortar and sieved. The total copper content of the solution increased to 144.0 grams per liter after 6 hours, then dropped to 140.0 grams per liter. Supersaturation occurred after 5 hours when the dissolved copper content showed a decreased rate of rise indicating some crystallization had started. Cupric copper was maintained between 85 and 95 grams per liter and ammonium carbonate between 320 and 360 grams per liter during the leaching period by continuous dissolution from the solid materials.

PRODUCT.—$CuCO_3.2NH_3$—162 GRAMS

|     | Analysis | Theoretical | Particle Size | |
| --- | --- | --- | --- | --- |
|     | Percent | Percent |  | Percent |
| Cu  | 40.89 | 40.31 | − 50+100 Mesh | 22 |
| NH$_3$ | 21.53 | 21.61 | −100+200 Mesh | 20 |
| CO$_2$ | 27.47 | 27.92 | −200+325 Mesh | 13 |
|     |       |       | −325 Mesh | 45 |
|     |       |       |       | 100 |

*Example 3*

A test similar to that in Example 2 was run except solid ammonium carbonate was added at 15 minute intervals after 5 hours' leaching. Two hours additional cycling was maintained during which precipitation occurred. During this time solid ammonium carbonate was added to maintain the NH$_3$ and CO$_2$ concentrations which were lowered by combination with copper as $CuCO_3.2NH_3$. The solution and crystals were allowed to remain in contact with each other in the system for 63 hours with no recirculation after which the crystals were filtered, dried, crushed and sieved.

PRODUCT.—$CuCO_3.2NH_3$

|     | Analysis | Theoretical | Particle Size | |
| --- | --- | --- | --- | --- |
|     | Percent | Percent |  | Percent |
| Cu  | 40.49 | 40.31 | − 50+100 Mesh | 29 |
| NH$_3$ | 21.37 | 21.61 | −100+200 Mesh | 22 |
| CO$_2$ | 28.25 | 27.92 | −200+325 Mesh | 19 |
|     |       |       | −325 Mesh | 30 |
|     |       |       |       | 100 |

*Example 4*

Rich leaching solution from a leaching test was subjected to two types of oxidizing techniques as follows:

(a) Air was bubbled through the solution contained in an open cylinder through an unrestricted glass tube.
(b) Air was bubbled at a comparatively slower rate into a cylinder through which the solution was continually recirculated.

The following particle sizes were obtained after filtration, drying, light crushing to break up aggregates and large crystals, and sieving to pass a 50-mesh sieve.

PARTICLE SIZE OF $CuCO_3.2NH_3$

|     | Non-Circulating | Circulating |
| --- | --- | --- |
|     | Percent | Percent |
| − 50+100 Mesh | 44 | 20 |
| −100+200 Mesh | 32 | 22 |
| −200+325 Mesh | 14 | 17 |
| −325 Mesh | 10 | 41 |
|     | 100 | 100 |

The process of this invention produces directly the substantially pure raw material, cupric diammino carbonate, which can be easily and economically converted to a finished product without requiring further purification or elaborate reprocessing. Furthermore, the method includes an economical and effective crystallization step which is accomplished by the use of a novel technique in inducing crystallization, namely, the use of an oxidizing agent, preferably a gas such as air, rather than the use of steam or similar more costly materials. The process of this invention is quite important in that it results in the production of substantially pure crystals of cupric diammino carbonate from either contaminated or uncontaminated leaching solutions. Furthermore, the crystallization is easily controlled to produce crystals having desirable particle sizes and physical shapes.

One very important feature of the invention is that the resulting copper compound, the cupric diammino carbonate, is of crystalline structure. Being crystalline it is obtained at a high state of purity from the leaching solutions. The crystalline product is also easily filtered or centrifuged, and is dried in conventional equipment. As it is a substantially pure chemical compound, its composition is uniform and does not require analysis before use. As the product is granular instead of powdery, it is easily handled in subsequent operations and has good flow characteristics. The crystals are also stable in air under dry conditions and may be dried without special blanketing precautions against oxidation.

Having described my invention as related to the embodiments set out herein, it is my intention that the invention be not limited by any of the details of description unless otherwise specified, but rather be construed broadly within its spirit and scope as set out in the accompanying claims.

I claim:

1. The method of making substantially pure crystalline cupric diammino carbonate which comprises leaching metallic copper-containing material with an aqueous solution of ammonium carbonate containing cupric ions until a substantially saturated solution of cupric-cuprous diammino carbonate is obtained, contacting said solution with an oxidizing agent for a time sufficient to convert said solution to a supersaturated solution of cupric diammino carbonate, crystallizing said cupric diammino carbonate from said solution thereby producing substantially pure crystals of cupric diammino carbonate and separating the crystals from the liquid.

2. The method of making substantially pure crystalline cupric diammino carbonate which comprises leaching metallic copper-containing material with an aqueous solution of ammonium carbonate containing cupric ions until a substantially saturated solution of cupric-cuprous diammino carbonate is obtained, the aqueous solution having an ammonium carbonate concentration of about 280 to 425 grams per liter, contacting said solution with an oxidizing agent for a time sufficient to convert said solution to a supersaturated solution of cupric diammino carbonate, crystallizing said cupric diammino carbonate from said solution thereby producing substantially pure crystals of cupric diammino carbonate and separating the crystals from the liquid.

3. The method of making substantially pure crystalline cupric diammino carbonate which comprises leaching metallic copper-containing material with an aqueous solution of ammonium carbonate containing cupric ions until a substantially saturated solution of cupric-cuprous diammino carbonate is obtained, the aqueous solution having an ammonium carbonate concentration of about 280 to 425 grams per liter in which the ratio of NH$_3$ to CO$_2$ is at least 2 to 1 on a mol basis, contacting said solution with a gaseous oxidizing agent for a time sufficient to convert said solution to a supersaturated solution of cupric diammino carbonate, crystallizing said cupric diammino carbonate from said solution thereby producing substantially pure crystals of cupric diammino carbonate and separating the crystals from the liquid.

4. The method of making substantially pure crystalline cupric diammino carbonate which comprises leaching metallic copper-containing material with an aqueous solution of ammonium carbonate containing cupric ions until a substantially saturated solution of cupric-cuprous diammino carbonate is obtained, the aqueous solution having an ammonium carbonate concentration of about 280 to 425 grams per liter and the initial concentration of total copper in the leaching solution being about 70 to 160 grams per liter, the ammonium carbonate in the solution having a $NH_3$ to $CO_2$ ratio of at least 2 to 1 on a mol basis, contacting said solution with a gaseous oxidizing agent for a time sufficient to convert said solution to a supersaturated solution of cupric diammino carbonate, crystallizing said cupric diammino carbonate from said solution thereby producing substantially pure crystals of cupric diammino carbonate and separating the crystals from the liquid.

5. The method of making substantially pure crystalline cupric diammino carbonate which comprises leaching metallic copper-containing material with an aqueous solution of ammonium carbonate containing cupric ions until a substantially saturated solution of cupric-cuprous diammino carbonate is obtained, the aqueous solution having an ammonium carbonate concentration of about 280 to 425 grams per liter and the initial concentration of total copper in the leaching solution being about 70 to 160 grams per liter, the ammonium carbonate in the solution having a $NH_3$ to $CO_2$ ratio of at least 2 to 1 on a mol basis, contacting said solution with a gaseous oxidizing agent for a time sufficient to convert said solution to a supersaturated solution of cupric diammino carbonate, crystallizing said cupric diammino carbonate from said solution thereby producing substantially pure crystals of cupric diammino carbonate, separating the crystals from the liquid and regenerating said liquid for further leaching by adding ammonia and carbon dioxide thereto.

6. The method of making substantially pure crystalline cupric diammino carbonate which comprises leaching metallic copper-containing material with an aqueous solution of ammonium carbonate containing cupric ions until a substantially saturated solution of cupric-cuprous diammino carbonate is obtained, the aqueous solution having an ammonium carbonate concentration of about 280 to 425 grams per liter and the initial concentration of total copper in the leaching solution being about 70 to 160 grams per liter, the ammonium carbonate in the solution having a $NH_3$ to $CO_2$ ratio of at least 2 to 1 on a mol basis, contacting said solution with a gaseous oxidizing agent for a time sufficient to convert said solution to a supersaturated solution of cupric diammino carbonate, crystallizing said cupric diammino carbonate from said solution thereby producing substantially pure crystals of cupric diammino carbonate, separating the crystals from the liquid and drying said crystals at a temperature of about 50 to 70° C.

7. The method of making substantially pure crystalline cupric diammino carbonate which comprises leaching metallic copper-containing material with an aqueous solution of ammonium carbonate containing cupric ions until a substantially saturated solution of cupric-cuprous diammino carbonate is obtained, the aqueous solution having an ammonium carbonate concentration of about 280 to 425 grams per liter and the initial concentration of total copper in the leaching solution being about 70 to 160 grams per liter, the ammonium carbonate in the solution having a $NH_3$ to $CO_2$ ratio of at least 2 to 1 on a mol basis, bubbling air through said solution for a time sufficient to convert said solution to a supersaturated solution of cupric diammino carbonate, crystallizing said cupric diammino carbonate from said solution thereby producing substantially pure crystals of cupric diammino carbonate, separating the crystals from the liquid and regenerating said liquid for further leaching by adding ammonia and carbon dioxide thereto.

8. The method of making substantially pure crystalline cupric diammino carbonate which comprises leaching metallic copper-containing material with an aqueous solution of ammonium carbonate containing cupric ions until a substantially saturated solution of cupric-cuprous diammino carbonate is obtained, the aqueous solution having an ammonium carbonate concentration of about 280 to 425 grams per liter and the initial concentration of total copper in the leaching solution being about 70 to 160 grams per liter, the ammonium carbonate in the solution having a $NH_3$ to $CO_2$ ratio of at least 2 to 1 on a mol basis, bubbling air through said solution for a time sufficient to convert said solution to a supersaturated solution of cupric diammino carbonate, crystallizing said cupric diammino carbonate from said solution thereby producing substantially pure crystals of cupric diammino carbonate, separating the crystals from the liquid and drying said crystals at a temperature below the decomposition temperature of said wet crystals.

References Cited in the file of this patent

UNITED STATES PATENTS

| | | |
|---|---|---|
| 1,204,843 | Bretherton | Nov. 14, 1916 |
| 2,488,201 | Kenny | Nov. 15, 1949 |
| 2,647,829 | McGauley | Aug. 4, 1953 |
| 2,647,830 | Allen | Aug. 4, 1953 |
| 2,647,831 | Allen | Aug. 4, 1953 |
| 2,647,832 | Allen | Aug. 4, 1953 |
| 2,687,953 | Kenny | Aug. 31, 1954 |